United States Patent [19]

Gerace

[11] Patent Number: 4,581,281

[45] Date of Patent: Apr. 8, 1986

[54] SELF-PRIMING PRESSURE-SENSITIVE ADHESIVE TAPE

[75] Inventor: Michael J. Gerace, Centerville, Ohio

[73] Assignee: Protective Treatments, Inc., Dayton, Ohio

[21] Appl. No.: 597,150

[22] Filed: Apr. 5, 1984

[51] Int. Cl.⁴ .......................... C09J 7/02; B60R 13/00; B32B 25/12

[52] U.S. Cl. ..................................... 428/215; 428/31; 428/344; 428/354; 428/355; 428/356; 428/429; 428/448; 428/413; 428/414; 428/441; 428/465; 428/440; 428/467; 428/497; 428/493; 428/466; 428/494

[58] Field of Search ................. 428/31, 215, 441, 465, 428/497, 440, 494, 467, 493, 413, 414, 429, 448, 344, 466, 354, 355, 356

[56] References Cited

U.S. PATENT DOCUMENTS

| | | | |
|---|---|---|---|
| 3,896,245 | 7/1975 | Seto et al. | 428/7 |
| 4,061,805 | 12/1977 | Thompson et al. | 428/31 |
| 4,260,659 | 4/1981 | Gobran | 428/356 |
| 4,393,080 | 7/1983 | Pawelchak et al. | 428/356 |

FOREIGN PATENT DOCUMENTS 2737828 3/1979 Fed. Rep. of Germany ...... 428/355

Primary Examiner—Patrick C. Ives
Attorney, Agent, or Firm—Killworth, Gottman, Hagan & Schaeff

[57] ABSTRACT

A self-priming pressure-sensitive adhesive bonding tape is provided having a layer of a primary pressure-sensitive adhesive material coated onto one or more surfaces with a film of a secondary pressure-sensitive adhesive material. Both the primary and secondary pressure-sensitive adhesives are modified by the addition of adhesion promoters to enhance the wetting characteristics of the tape. The film thickness of the secondary pressure-sensitive adhesive is such that the film has discontinuities which enable at least a portion of the primary pressure-sensitive adhesive layer to be directly exposed to the substrate. Bonding is accomplished with the participation of both the primary and secondary pressure-sensitive adhesives.

17 Claims, No Drawings

SELF-PRIMING PRESSURE-SENSITIVE ADHESIVE TAPE

BACKGROUND OF THE INVENTION

The present invention relates to pressure-sensitive adhesive bonding tapes, and more particularly to a bonding tape having a layer of a primary pressure-sensitive adhesive material coated with a film of a secondary pressure-sensitive adhesive material.

Pressure sensitive adhesive tapes are commonly employed in adhesive fastening in a wide variety of application. However, in situations were a bond must be made to or between low energy surfaces, adequate adhesion is difficult to achieve. A low energy surface may be defined for purposes of this specification as a surface having a critical surface tension low enough so that there will not be sufficient wetting by an adhesive. An example of adhesive bonding between low energy surfaces is the bonding of an automobile windshield to a car body. The surfaces to be joined are glass and painted metal (especially the newer acrylic high solids enamel paints), both low energy surfaces.

The principal problem in obtaining adequate adhesion to low energy substrates is poor surface to surface contact between adhesive and substrate because the adhesive cannot properly spread and wet the substrate. This may result in adhesive failure during use. Moreover, the difficulties in achieving good adhesion to a low energy surface are increased when excess moisture is present and/or during application of repeated cyclic stresses such as vibrations. Both conditions are common in the bonding of windshields to automobile bodies.

One method practiced by the prior art in attempting to overcome poor adhesion to low energy surfaces is to apply a primer to the low energy surface prior to bonding. The primer is usually applied as a liquid and possesses a surface tension low enough to promote wetting of the substrate. Upon solvent release, or other suitable mechanisms, the primer sets up to form a continuous film over the surface of the substrate. With the film of primer in place, suitable bonding of the adhesive to the substrate can be achieved. Although the use of primers overcomes the poor adhesion characteristics of pressure-sensitive adhesive tapes to low energy surfaces, the need to apply a primer prior to bonding increases the time, costs, and labor to perform such operations. Significant time, labor and material costs are required to apply and then cure or dry primer layers on one or more of the low energy substrate surfaces to be bonded.

The use of energy-absorbing bonding tapes coated with pressure-sensitive adhesives, such as the energy-absorbing bonding tapes disclosed in commonly-assigned U.S. Pat. Nos. 3,896,245 and 4,061,805, is also known for adhering automotive trim strips and the like to painted metal substrates. However, where it is desired to bond two low energy surfaces together, it has been found that with the pressure-sensitive adhesives heretofore utilized with such bonding tapes that bonding performance is often inadequate, especially where the bond is subjected to moist conditions and/or cyclic stresses.

Accordingly, the need exists in the art for a pressure-sensitive adhesive bonding tape which overcomes the problems of prior art tapes and yet achieves adequate bonding without the need for the application of a separate layer or layers of primer to the substrate(s) to be bonded. By achieving adequate adhesion without the use of primers, the user would realize both time and cost savings.

SUMMARY OF THE INVENTION

The present invention meets that need by providing a self-priming pressure-sensitive adhesive bonding tape having a layer of a primary pressure-sensitive adhesive material coated on one or more surfaces with a film of a secondary pressure-sensitive adhesive material. Both the primary and secondary pressure-sensitive adhesives are modified by the addition of adhesion promoters to enhance the wetting characteristics of the tape. Additionally, the film thickness of the secondary pressure-sensitive adhesive is reduced so that the film has discontinuities which enable at least a portion of the primary pressure-sensitive adhesive layer to be directly exposed to the substrate. This permits both the primary and secondary pressure-sensitive adhesives in the tape to participate in the bonding process to the low energy substrate. Heretofore, prior art tapes have relied upon the adhesive characteristics of the coated pressure-sensitive adhesive film alone to achieve bonding and have not used the adhesive properties of the underlying support.

Bonding tapes of the present invention are applicable to a wide variety of uses which require the bonding together of low energy surfaces such as glass and painted or polymer coated substrates. In particular, the bonding tapes of the present invention may find use in adhering automobile windshield glass to automotive bodies and automotive trim strips or body side moldings to automobile bodies.

The self-priming bonding tapes of the present invention may be formulated from a number of suitably compounded pressure-sensitive adhesive systems or modifications thereof. The invention is not restricted to the specific composition of either the primary pressure-sensitive adhesive base layer or the secondary pressure-sensitive adhesive film over the base layer. Rather, I have discovered that by proper selection of adhesion promoters which are compounded with the primary and secondary adhesives in combination with a reduction of the film thickness of the secondary adhesive to expose portions of the primary adhesive directly to the substrate, a primerless bonding tape results which has superior adhesion characteristics and which can be used without preapplication of a separate primer layer. The bonding tape is especially useful to bond substrates together which are exposed to moist conditions and/or cyclic stresses.

Suitable tacky pressure-sensitive adhesives of the rubber resin type may be employed in the practice of the present invention. Suitably compounded, they may be used to form either the primary pressure-sensitive adhesive base layer or the secondary pressure-sensitive adhesive film. Examples include natural rubber adhesives, block copolymers, butyl rubber, polyisobutylene, halobutyl rubbers, acrylic adhesives, vinyl ether polymers, silicone pressure-sensitive adhesives, styrene-butadiene rubber, butadiene-acrylonitrile rubber, polychloroprene, polyurethanes, polyvinyl pyrrolidone, and ethylene vinyl acetate.

Many known tackifiers and adhesion promoters may also be used in the practice of the present invention. They may be compounded with either the primary pressure-sensitive adhesive base layer or the secondary pressure-sensitive adhesive film layer, or two or more promoters may be combined for use. Examples of suitable adhesion promoters include wood rosin and its derivatives, terpene resins, petroleum-based resins, polyolefinic tackifiers, coumarone-indene resins, hydroabietyl alcohol esters, polyisobutylenes, polyamide resins, phenolic resins, epoxy resins, petroleum-based oils, pine tars, acrylic monomers and polymers, polyester resins, malamine resins, and silanes, including mercaptosilanes and epoxysilanes.

Accordingly, it is an object of the present invention to provide a pressure-sensitive adhesive bonding tape which will bond to low energy surfaces without the need for the application of a separate primer layer. This and other objects and advantages of the invention will becomes apparent from the following detailed description, illustrative examples, and appended claims.

DESCRIPTION OF THE PREFERRED EMBODIMENTS

The primary pressure-sensitive adhesive material utilized in the adhesive bonding tape of the present invention can be any of a number of suitably compounded adhesives. (For example, tacky pressure-adhesives of the rubber resin type such as natural rubber adhesive, block copolymers, butyl rubber, polyisobutylene, halobutyl rubbers, acrylic adhesives, vinyl ether polymers, silicone pressure-sensitive adhesives, styrene-butadiene rubber, butadiene-acrylonitrile rubber, polychloroprene, polyurethanes, polyvinyl pyrrolidone, and ethylene vinyl acetate may all be utilized.) Additionally, suitable adhesive materials such as those disclosed in commonly-assigned U.S. Pat. No. 3,896,245 may also be utilized in the practice of the present invention. Other suitable commercially available adhesives include Hycar 2100×20 acrylic polymer from B.F. Goodrich Co., the Gelva acrylic polymers from Monsanto Corp., or the Aroset acrylic resins from Ashland Chemical Co. Preferably, the primary pressure-sensitive adhesive in in the form of a tape 0.10 to 1.00 inches thick, and of varying width and length (or varying diameter when the tape has a circular cross-section).

The secondary pressure-sensitive adhesive is preferably a film coated on the tape. The secondary pressure-sensitive adhesive film layer may also be selected from the above group of pressure-sensitive materials. This secondary pressure-sensitive adhesive material is applied as a thin film to the primary pressure-sensitive adhesive layer. It has been found that a film thickness of approximately between 0.00005 and 0.005 inches is suitable for the practice of the present invention. This can be achieved by application of the secondary pressure-sensitive adhesive material at a dry coating weight of between 0.1 to 10.00 grams/ft$^2$.

The film thickness on the primary pressure-sensitive adhesive layer is controlled by adjusting the solids and viscosity level of the secondary adhesive through dilution with one or more known solvents. The more solvent that is added, the lower the solids content of the secondary adhesive and the lower its viscosity. Consequently, the lower the coating weight applied for a given set of conditions, the lower the final film thickness. For many applications of the present invention, a solids level of approximately 1% to 10% by weight has been found to be useful.

The thin film of the secondary pressure-sensitive adhesive may be applied by any of a number of known procedures. These procedures include dip coating, spray coating, adhesive film transfer, roll coating, or any other suitable method.

The thickness and/or method of coating of the layer of secondary pressure-sensitive adhesive must be controlled so that at least a portion of the film contains discontinuities which expose the underlying layer of primary pressure-sensitive adhesive directly to the substrate to be bonded. These discontinuities which may be pinhole discontinuities or larger, and which are controlled by the coating weight and thickness of the film of the secondary pressure-sensitive adhesive which is applied, permit both pressure-sensitive adhesives to participate in the bonding to the substrate.

Another important feature of the present invention is the use of a tackifier or adhesion promoter in both the primary and secondary pressure-sensitive adhesives. The tackifier or adhesion promoter may be chemically or physically admixed with the adhesives or adhesion could be promoted by a physical treatment, such as corona discharge, of the adhesive. Additive-type tackifiers and adhesion promoters which have been found useful in the practice of the present invention include wood rosin and its derivatives, terpene resins, petroleum-based resins, polyolefinic tackifiers, coumarone-indene resins, hydroabietyl alcohol esters, polyisobutylenes, polyamide resins, phenolic resins, epoxy resins, petroleum-based oils, pine tars, acrylic monomers and polymers, polyester resins, melamine resins, and silanes, including mercaptosilanes, epoxysilanes. gamma-glycidoxypropyltrimethoxysilane and gamma-mercaptopropyltrimethoxysilane. It has been found that addition of adhesion promoters in amounts of from about 0.05% to 10% by weight produce a useful pressure-sensitive adhesive bonding tape.

The invention may be further illustrated by the following non-limiting example.

EXAMPLE

A standard butyl automobile window tape composition such as 22% butyl rubber, 21% silicate filler, 20% asbestos fibers, 12% carbon black, and 25% paraffinic oil was used as the primary pressure-sensitive adhesive layer. To that standard butyl composition, approximately 0.3% by weight of a mercaptosilane adhesion promoter was added. The mercaptosilane adhesion promoter is commercially available as Silane A-189 from Union Carbide Company.

The butyl compound with adhesion promoter was extruded into a 0.480 inch diameter round shaped tape and then dip coated through an acrylic adhesive and dried prior to winding. The acrylic adhesive is a Gelva RA-1753 acrylic adhesive commercially available from Monsanto Corporation. The acrylic adhesive was compounded with an epoxy silane adhesion promoter available commercially from Union Carbide Company and identified as Silane A-187. Approximately 0.3% by weight of the epoxy silane adhesion promoter was added to the acrylic adhesive.

The adhesive coating level was controlled by diluting the acrylic adhesive with methyl acetate solvent. A 6% solids acrylic pressure-sensitive adhesive. solution was used for the dip coating operation. This resulted in a final film thickness of approximately 0.0003 inches.

The effectiveness of the self priming adhesive bonding tape compared to systems requiring a primer layer and prior art tapes without primers was evaluated by a laboratory fatigue testing system as set forth in specification ESB-M3G-95-D Part 3.3 of the Ford Motor Company. The fatigue testing system determined the bonding durability of the tapes tested under simulated road vibrations.

The fatigue tester put an oscillating shear force on each tape which bonded a glass and metal test cell together. Water was continuously applied to the test cell during application of the shear force.

The metal and glass portions of the test cell were 2"×8" in size and were bonded to each other with the three tapes tested. The cell had a bonded overlap area of 6"×¾".

During the test, the metal and glass portions of the cell were pulled apart in shear with an oscillation amplitude of ±0.30" and a frequency of 660 cycles per minute. The test cells were periodically evaluated for adhesive failure. Failure was taken as either complete delamination of any or all of the glass or metal surface at any point on the cell, excluding the ends. Failure was also considered as a ¼" delamination at any of the four end interfaces. The results of the fatigue tests are reported below.

TABLE 1

Fatigue Testing Comparison

| No. of Cycles | Cell No. 1 Standard Tape With Primer | Cell No. 2 Standard Tape Without Primer | Cell No. 3 Self-Priming Tape Without Primer |
|---|---|---|---|
| 100,000 | Pass | Pass | Pass |
| 200,000 | Pass | Failed | Pass |
| 300,000 | Pass | — | Pass |
| 1,000,000 | Pass | — | Pass |

The standard tape utilized in cell 1 is a butyl based pressure-sensitive adhesive tape having a composition of 22% butyl rubber, 22% silicate filler, 20% asbestos fibers, 12% carbon black, and 25% paraffinic oil. The primer layers were applied to both the glass and metal test surfaces and was aminosilane based for the glass and hydrocarbon based for the painted metal. The same standard butyl based pressure-sensitive adhesive tape was used in cell no. 2, but without the primer layers. Finally, cell no. 3 utilized the self-priming tape of the present invention described above which contained a primary pressure-sensitive adhesive layer of butyl rubber modified by a mercaptosilane adhesion promoter and a secondary pressure-sensitive adhesive film thereon which had been modified by an epoxy silane adhesion promoter.

As can be seen, cell no. 2 demonstrates the need for primer layers when standard pressure-sensitive adhesive tapes are utilized so that adequate adhesion of glass to painted metal can be obtained. Comparison of the results of cell no. 1 versus cell no. 3 show the ability of the self-priming pressure-sensitive adhesive tapes of the present invention to perform as well as prior art tapes but without the need for primer layers.

While the methods and compositions herein described constitute the preferred embodiments of the invention, it is to be understood that the invention is not limited to these precise methods and compositions, and that changes may be made in either without departing from the scope of the invention, which is defined in the appended claims.

What is claimed is:

1. A self-priming pressure-sensitive adhesive bonding tape comprising a layer of a primary pressure-sensitive adhesive material containing an effective amount of a first adhesion promoter, and a thin film of a secondary pressure-sensitive adhesive material containing an effective amount of a second adhesion promoter covering said layer of primary pressure-sensitive adhesive material but having discontinuities therein such that when said tape is applied to a substrate both of said primary and secondary pressure-sensitive adhesive materials bond directly to said substrate.

2. The self-priming bonding tape of claim 1 in which said thin film has a thickness of between 0.00005 and 0.005 inches.

3. The self-priming bonding tape of claim 2 in which said secondary pressure-sensitive material is applied at a dry coating weight of between 0.1 and 10.0 grams/ft$^2$.

4. The self-priming bonding tape of claim 1 in which said primary pressure-sensitive adhesive material is selected from the group consisting of natural rubber adhesives, block copolymers, butyl rubber, polyisobutylene, halobutyl rubbers, acrylic adhesives, vinyl ether polymers, silicone pressure-sensitive adhesives, styrene-butadiene rubber, butadiene-acrylonitrile rubber, polychloroprene, polyurethanes, polyvinyl pyrrolidone, and ethylene vinyl acetate and mixtures thereof.

5. The self-priming bonding tape of claim 1 in which said primary pressure-sensitive adhesive material comprises a butyl rubber.

6. The self-priming bonding tape of claim 1 in which said secondary pressure-sensitive adhesive material is selected from the group consisting of natural rubber adhesives, block copolymers, butyl rubber, polyisobutylene, halobutyl rubbers, acrylic adhesives, vinyl ether polymers, silicone pressure-sensitive adhesives, styrene-butadiene rubber, butadiene-acrylonitrile rubber, polychloroprene, polyurethanes, polyvinyl pyrrolidone, and ethylene vinyl acetate and mixtures thereof.

7. The self-priming bonding tape of claim 1 in which said secondary pressure-sensitive adhesive material comprises an acrylic adhesive.

8. The self-priming bonding tape of claim 1 in which said first adhesion promoter is selected from the group consisting of wood rosin and its derivatives, terpene resins, petroleum-based resins, polyolefinic tackifiers, coumarone-indene resins, hydroabietyl alcohol esters, polyisobutylenes, polyamide resins, phenolic resins, epoxy resins, petroleum-based oils, pine tars, acrylic monomers and polymers, polyester resins, melamine resins, and silanes, including mercaptosilanes and epoxysilanes, and mixtures thereof.

9. The self-priming bonding tape of claim 5 in which said first adhesion promoter is a mercaptosilane.

10. The self-priming bonding tape of claim 1 in which said second adhesion promoter is selected from the group consisting of wood rosin and its derivatives, terpene resins, petroleum-based resins, polyolefinic tackifiers, coumarone-indene resins, hydroabietyl alcohol esters, polyisobutylenes, polyamide resins, phenolic resins, epoxy resins, petroleum-based oils, pine tars, acrylic monomers and polymers, polyester resins, melamine resins, and silanes, including mercaptosilanes and epoxysilanes, and mixtures thereof.

11. The self-priming bonding tape of claim 7 in which said second adhesion promoter is an epoxysilane.

12. The self-priming bonding tape of claim 1 in which said first adhesion promoter is present in an amount of from 0.05% to 10% by weight of said primary pressure-sensitive adhesive.

13. The self-priming bonding tape of claim 1 in which said second adhesion promoter is present in an amount of from 0.05% to 10% by weight of said secondary pressure-sensitive adhesive.

14. The self-priming bonding tape of claim 1 in which the thickness of said layer of primary pressure-sensitive adhesive material is from 0.010 to 1.00 inch.

15. In combination, a laminate comprising a self-priming pressure-sensitive adhesive bonding tape adhered directly to a substrate having a low energy surface, said self-priming pressure-sensitive adhesive bonding tape comprising a layer of a primary pressure-sensitive adhesive material containing an effective amount of a first adhesion promoter, and a thin film of a secondary pressure-sensitive adhesive material containing an effective amount of a second adhesion promoter, said thin film being interposed between said layer and said substrate surface and having discontinuities therein, both of said primary and secondary pressure-sensitive adhesive materials bonding directly to said surface of said substrate.

16. The laminate of claim 15 in which said substrate is glass.

17. The laminate of claim 15 in which said substrate is painted metal.

* * * * *